(12) United States Patent (10) Patent No.: US 12,601,145 B2

Myklejord (45) Date of Patent: Apr. 14, 2026

(54) EXCLUSION ZONE OR INCLUSION ZONE GENERATION FOR OBJECT DETECTION

(71) Applicant: Caterpillar Inc., Peoria, IL (US)

(72) Inventor: Duane Myklejord, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 110 days.

(21) Appl. No.: 18/799,725

(22) Filed: Aug. 9, 2024

(65) Prior Publication Data

US 2026/0043214 A1 Feb. 12, 2026

(51) Int. Cl.

| | |
|---|---|
| *E02F 9/20* | (2006.01) |
| *B60R 1/23* | (2022.01) |
| *B60R 1/26* | (2022.01) |
| *E02F 9/26* | (2006.01) |
| *G06V 20/56* | (2022.01) |
| *G06V 20/58* | (2022.01) |
| *G01S 13/931* | (2020.01) |

(52) U.S. Cl.

CPC .............. *E02F 9/2033* (2013.01); *B60R 1/23* (2022.01); *B60R 1/26* (2022.01); *E02F 9/265* (2013.01); *G06V 20/56* (2022.01); *G06V 20/58* (2022.01); *G01S 2013/93272* (2020.01); *G06T 2207/20036* (2013.01)

(58) Field of Classification Search

CPC .......... E02F 9/2033; E02F 9/265; B60R 1/23; B60R 1/26; G06V 20/56; G06V 20/58; G01S 2013/93272; G06T 2207/20036

USPC ......................................................... 701/50

See application file for complete search history.

(56) References Cited

U.S. PATENT DOCUMENTS

| | | |
|---|---|---|
| 10,532,698 B2 | 1/2020 | Potnis et al. |
| 11,366,986 B2 | 6/2022 | Gavrilovic et al. |
| 2006/0034535 A1* | 2/2006 | Koch ......................... E02F 9/26 |
| | | 382/284 |
| 2020/0285904 A1* | 9/2020 | Gavrilovic ............. G06V 20/58 |
| 2022/0417586 A1 | 12/2022 | Erbiceanu-Tener et al. |
| 2023/0025194 A1 | 1/2023 | Sasaki |
| 2023/0235532 A1 | 7/2023 | Hitachi |

FOREIGN PATENT DOCUMENTS

| | | |
|---|---|---|
| CN | 115936962 A | 4/2023 |
| KR | 20220039563 A | 3/2022 |

OTHER PUBLICATIONS

"OpenCV: Background Subtraction," https://docs.opencv.org/4.x/d8/d38/tutorial_bgsegm_bg_subtraction.html, 2 pages.
"OpenCV: Morphological Transformations," https://docs.opencv.org/4.x/d9/d61/tutorial_py_morphological_ops.html, 3 pages.

* cited by examiner

*Primary Examiner* — Helal A Algahaim
*Assistant Examiner* — Leah N Miller

(57) ABSTRACT

A controller may obtain, from a camera, a first image and a second image depicting a work machine in an environment, where an implement of the work machine has moved, or the work machine has moved in the environment, in a depiction of the second image relative to the first image. The controller may generate a difference image that depicts a region of difference between the first image and the second image. The controller may perform object detection on image data from the camera based on the difference image, where the region of difference depicted in the difference image is an exclusion zone or an inclusion zone used for the object detection.

20 Claims, 4 Drawing Sheets

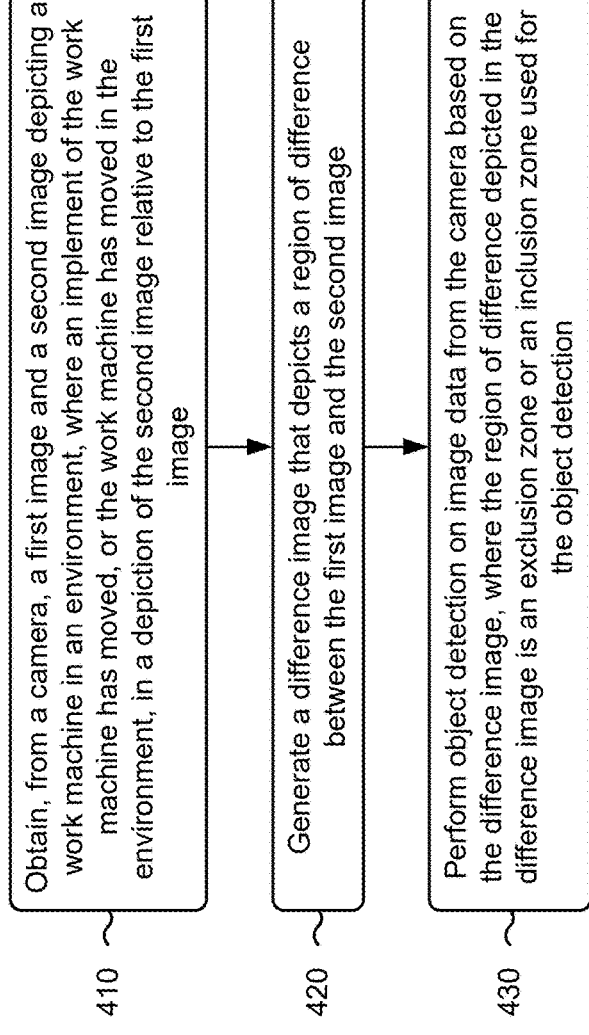

400

410   Obtain, from a camera, a first image and a second image depicting a work machine in an environment, where an implement of the work machine has moved, or the work machine has moved in the environment, in a depiction of the second image relative to the first image 420   Generate a difference image that depicts a region of difference between the first image and the second image 430   Perform object detection on image data from the camera based on the difference image, where the region of difference depicted in the difference image is an exclusion zone or an inclusion zone used for the object detection

FIG. 4

EXCLUSION ZONE OR INCLUSION ZONE GENERATION FOR OBJECT DETECTION

TECHNICAL FIELD

The present disclosure relates generally to work machines and, for example, to exclusion zone or inclusion zone generation for object detection.

BACKGROUND

Machines may be used to perform a variety of tasks at a worksite. For example, machines may be used to excavate, move, shape, contour, and/or remove material present at the worksite, such as gravel, concrete, asphalt, soil, and/or other materials. A machine may include a system for detecting objects at the worksite that may be of interest to the machine operator and/or to an autonomous control of the machine. As an example, the object detection system may detect humans in connection with a collision avoidance or a collision warning function of the machine. In many cases, an implement, such as a ripper or a backhoe, may be attached to the machine and in a field of view of a camera of the object detection system. Because the implement can be moved into various positions, the object detection system may be prone to misidentifying the implement as a human, thereby resulting in unnecessary avoidance actions being taken for the machine, excessive machine downtime, and/or work delays.

The object detection calibration system of the present disclosure solves one or more of the problems set forth above and/or other problems in the art.

SUMMARY

An object detection calibration system may include a camera configured to mount on a work machine and to capture images relating to an environment of the work machine. The object detection calibration system may include a controller configured to obtain, from the camera, a first image and a second image depicting the work machine in the environment, where an implement of the work machine has moved in a depiction of the second image relative to the first image. The controller may be configured to generate a difference image that depicts a region of difference between the first image and the second image. The controller may be configured to perform object detection on image data from the camera based on the difference image, where the region of difference depicted in the difference image is an exclusion zone for the object detection.

A method may include obtaining, from a camera, a first image and a second image depicting a work machine in an environment, where an implement of the work machine has moved, or the work machine has moved in the environment, in a depiction of the second image relative to the first image. The method may include generating a difference image that depicts a region of difference between the first image and the second image. The method may include performing object detection on image data from the camera based on the difference image, where the region of difference depicted in the difference image is an exclusion zone or an inclusion zone used for the object detection.

A work machine may include a frame, an implement connected to the frame, a camera configured to capture images relating to an environment of the work machine, and a controller. The controller may be configured to obtain, from the camera, a first image and a second image depicting the work machine in the environment, where the second image differs from the first image by a depiction of the work machine or the environment. The controller may be configured to generate a difference image that depicts a region of difference between the first image and the second image. The controller may be configured to perform object detection on image data from the camera based on the difference image, where the region of difference depicted in the difference image is an exclusion zone or an inclusion zone used for the object detection.

BRIEF DESCRIPTION OF THE DRAWINGS

FIG. 4 is a flowchart of an example process associated with exclusion zone or inclusion zone generation for object detection.

DETAILED DESCRIPTION

This disclosure relates to an object detection calibration system, which is applicable to any work machine. For example, the work machine may be a dozer, a backhoe loader, a wheel loader, a harvester, an excavator, a motor grader, a skid steer loader, or the like.

Figure 1:
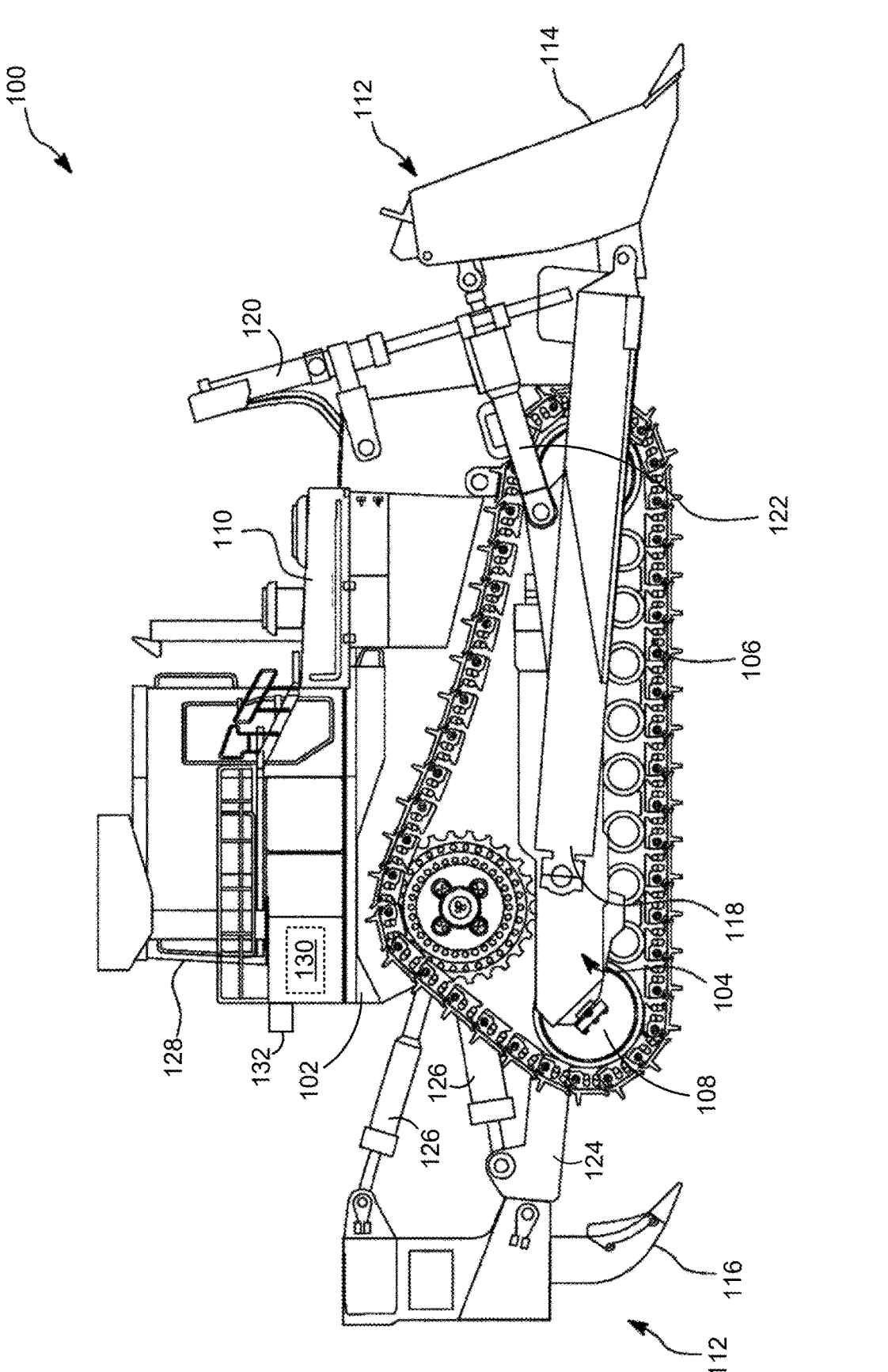
FIG. 1 is a side view of an example machine.

FIG. 1 is a side view of an example machine 100. The machine 100 may perform earth moving, excavation, or another operation associated with an industry such as construction or mining, among other examples. That is, the machine 100 is a work machine. For example, as illustrated in FIG. 1, the machine 100 is a dozer. However, the machine 100 may be another type of machine, as described above.

The machine 100 includes a frame 102 that is supported by an undercarriage 104 used to propel the machine 100 in a forward direction and/or a rearward direction. The undercarriage 104 is configured to engage a ground surface, such as a road or another type of terrain. The undercarriage 104 includes a pair of endless tracks 106 (only one endless track 106 is visible in FIG. 1) driven by respective drive wheels 108. Although the machine 100 is illustrated as having tracks 106, the undercarriage 104 may additionally, or alternatively, include one or more wheels for propelling the machine 100.

The frame 102 supports a prime mover 110. The prime mover 110 may include an engine (e.g., an internal combustion engine), such as a diesel engine, a gasoline engine, or a gaseous fuel engine, among other examples. Additionally, or alternatively, the prime mover 110 may include an electric motor (e.g., for electric powering of machine 100 or hybrid powering of machine 100 with the engine). The prime mover 110 is configured to provide power to drive the tracks 106. Furthermore, the prime mover 110 is configured to provide power to one or more implements 112 (e.g., by driving one or more hydraulic pumps that provide pressurized fluid to one or more actuators of the machine 100).

In FIG. 1, the implements 112 are illustrated as a blade 114, attached to a front of the machine 100, and a ripper 116 attached to a rear of the machine 100. However, an implement 112 may be, for example, a bucket, a scoop, a moldboard, a hook, and/or a backhoe, among other examples. The implements 112 are movable with respect to the frame 102. For example, the blade 114 may be pivotally connected to the frame 102 by arms 118 on each side of the machine 100. One or more first hydraulic cylinders 120 may be coupled to the frame 102 to support the blade 114 in the vertical direction and allow the blade 114 to move up or down vertically.

Additionally, one or more second hydraulic cylinders 122 may be included on each side of the machine 100 to allow a pitch or an angle of the blade 114 to change. The first and second hydraulic cylinders 120, 122 may be actuators that receive actuation instructions to adjust, lift, lower, or otherwise move and/or position the blade 114. Similarly, the ripper 116 may be pivotally connected to the frame 102 by one or more arms 124, and one or more hydraulic cylinders 126 may be coupled to the frame 102 to support the ripper 116 and allow the ripper 116 to move up or down vertically.

An operator station 128 may be supported on the frame 102. The operator station 128 may include an operator console having one or more displays (e.g., touchscreen displays) and/or one or more operator controls to operate and/or drive the machine 100. For example, the operator controls may include a joystick, a lever, and/or a knob, among other examples. The machine 100 includes a controller 130 for electrically controlling various aspects of the machine 100. For example, the controller 130 may send and receive signals from various components of the machine 100 during the operation of the machine 100.

In some implementations, the controller 130 may be configured to provide autonomous control of the machine 100 or autonomous control of one or more functions of the machine 100 (e.g., propulsion, braking, steering, implement movement, or the like). A camera 132, configured to mount on the machine 100 (e.g., to the frame 102 or the operator station 128), is communicatively coupled to the controller 130 (e.g., by a wired connection or wirelessly). The camera 132 may be configured to capture images, such as video, relating to an environment of the machine 100. The camera 132 may be positioned such that a portion of the machine 100, such as an implement 112, is in a field of view of the camera 132. As shown, the camera 132 may be positioned in a rear-facing configuration with respect to the machine 100 (e.g., mounted at a rear of the machine 100 to provide backup monitoring). In this position, the ripper 116 may be in a field of view of the camera 132. In some examples, the camera 132 may be positioned in a front-facing configuration or a side-facing configuration with respect to the machine 100.

As indicated above, FIG. 1 is provided as an example. Other examples may differ from what is described with regard to FIG. 1.

Figure 2:
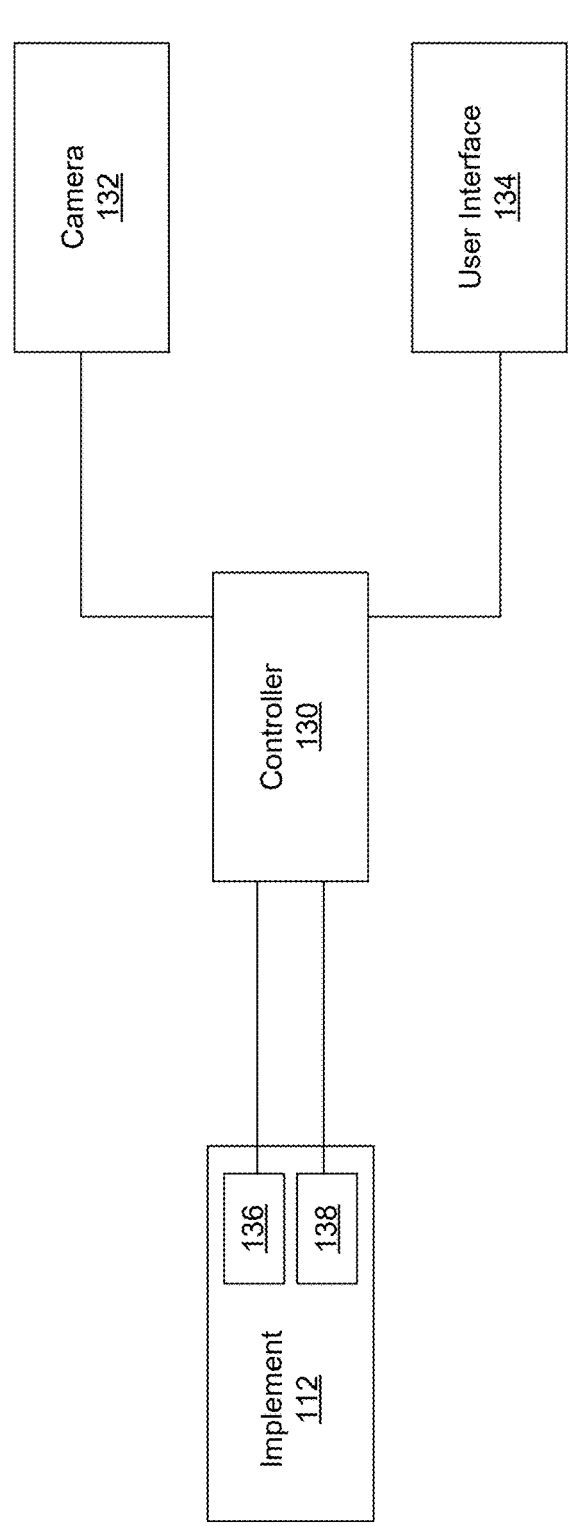
FIG. 2 is a diagram illustrating an example object detection calibration system.

FIG. 2 is a diagram illustrating an example object detection calibration system 200. The objection detection calibration system 200 may include the controller 130, the camera 132, a user interface 134, and/or an implement 112 (e.g., the ripper 116) in a field of view of the camera 132.

The controller 130 may include one or more memories and one or more processors communicatively coupled to the one or more memories. A processor may include a central processing unit, a graphics processing unit, a microprocessor, a controller, a microcontroller, a digital signal processor, a field-programmable gate array, an application-specific integrated circuit, and/or another type of processing component. The processor may be implemented in hardware, firmware, or a combination of hardware and software. The processor may be capable of being programmed to perform one or more operations or processes described elsewhere herein. A memory may include volatile and/or nonvolatile memory. For example, the memory may include random access memory (RAM), read only memory (ROM), a hard disk drive, and/or another type of memory (e.g., a flash memory, a magnetic memory, and/or an optical memory). The memory may be a non-transitory computer-readable medium. The memory may store information, one or more instructions, and/or software (e.g., one or more software applications) related to the operation of the controller 130.

The user interface 134 is communicatively coupled to the controller 130 (e.g., by a wired connection or wirelessly). The user interface 134 may include a system of hardware (e.g., input devices and/or output devices) and/or software through which a user (e.g., an operator of the machine 100) can interact with the controller 130. The user interface 134 may include a touchscreen display, a human-machine interface (HMI), a computer system, a virtual reality headset, an augmented reality headset, or the like. The user interface 134 may be on-board the machine 100 (e.g., in the operator station 128), may be off-board the machine 100 (e.g., at a back office location), or may be portable (e.g., a remote control device, a tablet computer, or the like).

One or more actuators 136 and/or one or more sensors 138 may be operably coupled to the implement 112, and communicatively coupled to the controller 130 (e.g., by a wired connection or wirelessly). The controller 130 may send control commands to the actuator 136 to control movement of the implement 112. The actuator 136 may include the hydraulic cylinder 120, the hydraulic cylinder 122, the hydraulic cylinder 126, a control valve, or another device capable of controlling movement of the implement 112. The controller 130 may receive sensor data from the sensor 138 indicating a position of the implement 112. The sensor 138 may include an angle sensor, a linear position sensor, an inertial measurement unit, or another sensor capable of detecting a position of the implement 112.

As indicated above, FIG. 2 is provided as an example. Other examples may differ from what is described with regard to FIG. 2.

Figure 3:
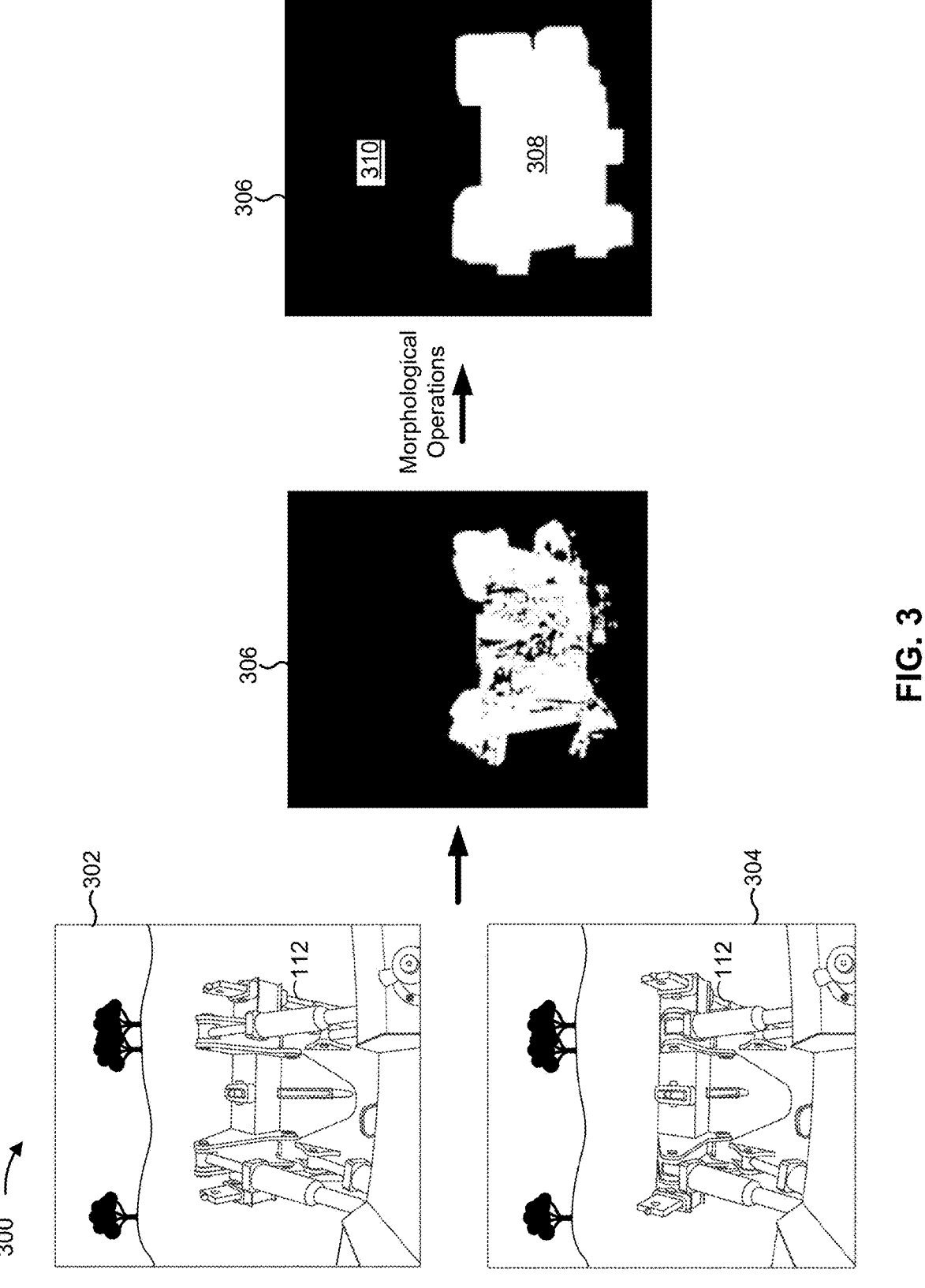
FIG. 3 is a diagram illustrating an example of image processing.

FIG. 3 is a diagram illustrating an example 300 of image processing.

The controller 130 may obtain, from the camera 132, a first image 302 and a second image 304 depicting the machine 100 in an environment (e.g., a worksite, a garage, or the like). In some implementations, operations described herein may use more than two images. The first image 302 and the second image 304 may be captured by the camera 132 at different points in time. The first image 302 and the second image 304 may depict a portion of the machine 100 that is in a field of view of the camera 132 at those different points in time. The second image 304 may differ from the first image 302 by its depiction of the machine 100 or its depiction of the environment.

In some implementations, the implement 112 has moved in a depiction of the second image 304 relative to the first image 302, as shown. For example, the first image 302 may depict the implement 112 in a first position (e.g., the camera 132 captured the first image 302 when the implement 112 was in the first position), and the second image 304 may depict the implement 112 in a second position different from the first position (e.g., the camera 132 captured the second image 304 when the implement 112 was in the second position).

The first image 302 may depict the implement 112 in the first position in which the implement 112 occupies a greater area of the first image 302 (e.g., a greater number of pixels) than any other position of the implement 112 would occupy, and the second image 304 may depict the implement 112 in the second position different from the first position. For example, in the case of the ripper 116, the first image 302 may depict the ripper 116 in a fully-raised position, and the second image 304 may depict the ripper 116 in a non-fully-raised position, which may be a fully-lowered position or another position that is lower than the fully-raised position. As another example, in the case of a backhoe, the first image 302 may depict the backhoe in a carry position, and the second image 304 may depict the backhoe in a non-carry position. "Carry position" may refer to a position of the backhoe used when the machine 100 is traveling between locations. For example, for a backhoe having a bucket pivotally attached to a stick that is pivotally attached to a boom, in the carry position, the boom is raised sufficiently to raise the bucket off the ground, the bucket is curled inward toward the stick, and the stick is pulled inward toward the boom. In some implementations, the first image may depict the implement 112 in a first position in which the implement 112 is farthest away from the camera 132 (e.g., the farthest away that any portion of the implement 112 can be from the camera 132 while still attached to the machine 100, which may correspond to a position in which the implement 112 is farthest away from the machine 100), and the second image depicts the implement in a second position in which the implement is closest to the camera 132 (e.g., the closest that any portion of the implement 112 can be to the camera 132 while still attached to the machine 100, which may correspond to a position in which the implement 112 is closest to the machine 100).

As described below, the controller 130 may obtain the first image 302 and the second image 304 in various ways. The controller 130 may obtain the first image 302 and the second image 304 in connection with an object detection calibration mode of the machine 100 (e.g., that is initiated by an operator of the machine 100), or during normal operation of the machine 100.

In some implementations, in a first type of object detection calibration mode, the controller 130 may cause presentation, in the user interface 134, of a first prompt that requests movement of the implement 112 into a first calibration position (e.g., a fully-raised position, a maximum position, a most-distal position, or the like). After an operator has performed the requested movement, the controller 130 may receive, via the user interface 134, a first indication that the implement 112 is moved into the first calibration position (e.g., the first indication may be an operator input made through the user interface 134). Responsive to the first indication, the controller 130 may obtain the first image 302 from the camera 132. For example, responsive to the first indication, the controller 130 may cause the camera 132 to capture the first image 302, and the controller 130 may receive the captured first image 302 from the camera 132. As another example, the controller 130 may receive a continuous stream of images or video from the camera 132, and responsive to the first indication, the controller 130 may extract the first image 302 from the stream. After obtaining the first image 302, the controller 130 may cause presentation, in the user interface 134, of a second prompt that requests movement of the implement 112 into a second calibration position (e.g., a fully-lowered position, a minimum position, a most-proximal position, or the like). After the operator has performed the requested movement, the controller 130 may receive, via the user interface 134, a second indication (similar to the first indication) that the implement 112 is moved into the second calibration position. Responsive to the second indication, the controller 130 may obtain the second image 304 from the camera 132, in a similar manner as the first image 302.

In some implementations, in a second type of object detection calibration mode, the controller 130 may cause (e.g., autonomously) the implement 112 to move into the first calibration position. For example, the controller 130 may transmit a command to the actuator 136 to cause the implement 112 to move into the first calibration position. Responsive to movement of the implement 112 into the first calibration position, the controller 130 may obtain the first image 302 from the camera 132. For example, while commanding the actuator 136, the controller 130 may monitor a position of the implement 112 via the sensor 138, and the controller 130 may cause the camera 132 to capture the first image 302, or the controller 130 may extract the first image 302 from a stream, in a similar manner as described above, responsive to detecting that the implement 112 is in the first calibration position. After obtaining the first image 302, the controller 130 may cause (e.g., autonomously) the implement 112 to move into the second calibration position, and responsive to movement of the implement 112 into the second calibration position, the controller 130 may obtain the second image 304 from the camera 132, in a similar manner as described above.

In some implementations, during normal operation of the machine 100 (e.g., while the machine 100 is performing work operations through operator control or autonomously), the controller 130 may detect that the implement 112 is in the first calibration position. For example, the controller 130 may detect that the position of the implement 112 is in the first calibration position using the sensor 138. Responsive to detection of the implement 112 in the first calibration position, the controller 130 may obtain the first image 302 from the camera 132 (e.g., that depicts the implement 112 in the first calibration position). For example, while monitoring a position of the implement 112 via the sensor 138, the controller 130 may cause the camera 132 to capture the first image 302, or the controller 130 may extract the first image 302 from a stream, in a similar manner as described above, responsive to detecting that the implement 112 is in the first calibration position. After obtaining the first image 302, the controller 130 may detect that the implement 112 is in the second calibration position (e.g., the implement 112 has been moved from the first calibration position into the second calibration position, directly or following various intermediate positions of the implement 112), and responsive to detection of the implement 112 in the second calibration position, the controller 130 may obtain the second image 304 from the camera 132 (e.g., that depicts the implement 112 in the second calibration position), in a similar manner as described above.

In some implementations, rather than the implement 112 having moved in a depiction of the second image 304 relative to the first image 302, the machine 100 has moved in the environment in a depiction of the second image 304 relative to the first image 302 (e.g., the implement 112 may be moved, or the machine 100 may be moved, but not both). For example, the first image 302 may depict the machine 100 in a first environment or a first location of the environment, and the second image 304 may depict the machine 100 in a second environment or a second location of the environment. In a similar manner as described above, the controller 130 may obtain the first image 302 and the second image 304 in connection with an object detection calibration mode of the machine 100 (e.g., that is initiated by an operator of the machine 100), or during normal operation of the machine 100.

For example, in the first type of object detection calibration mode, the controller 130 may cause prompting in the user interface 134 requesting movement of the machine 100 (e.g., to different environments or different locations within an environment), and the controller 130 may obtain the first image 302 and the second image 304 when the requested movements have been performed, in a similar manner as described above. As another example, in the second type of object detection calibration mode, the controller 130 may cause (e.g., autonomously) movement of the machine 100 (e.g., to different environments or different locations within an environment), and the controller 130 may obtain the first image 302 and the second image 304 when the movements have been performed, in a similar manner as described above. As a further example, during normal operation of the machine 100, the controller 130 may detect (e.g., using a global navigation satellite system (GNSS), or the like) movement of the machine 100 (e.g., to different environments or different locations within an environment), and the controller 130 may obtain the first image 302 and the second image 304 when the movements have been detected, in a similar manner as described above.

Once the first image 302 and the second image 304 have been obtained, the controller 130 may generate a difference image 306 based on the first image 302 and the second image 304. For example, the difference image 306 may be based on a comparison or a combination of the first image 302 and the second image 304. The difference image 306 may depict a region of difference 308 between the first image 302 and the second image 304. The region of difference 308 may indicate locations where the first image 302 and the second image 304 differ. For example, the region of difference 308 may include one or more pixels of the difference image 306 corresponding to pixels of the first image 302 and the second image 304 that differ. As an example, the region of difference 308 may include a pixel (or a group of pixels) that has the same location in the first image 302 and in the second image 304, but has different pixel values (e.g., pixel values that differ at all, pixel values that differ by a threshold amount, pixel values in different value ranges, different average pixel values over a group of pixels, or the like) for the first image 302 and for the second image 304. As another example, the region of difference 308 may include a pixel (or a group of pixels) that has moved locations from the first image 302 to the second image 304 (e.g., the pixel value(s) are the same or similar, but the location of the pixel(s) has changed from the first image 302 to the second image 304).

Thus, by changing the position of the implement 112 from the first image 302 to the second image 304, while the remainder of the machine 100 and the environment are unchanged, the region of difference 308 may relate to locations in the first image 302 and the second image 304 that depict the implement 112. Similarly, by changing the scene of the environment from the first image 302 to the second image 304, while the machine 100 is unchanged, the region of difference 308 may relate to locations in the first image 302 and the second image 304 that depict the environment.

The region of difference 308 may define, or may be defined by, a region of similarity 310 in the difference image 306. The region of similarity 310 may be outside of and non-overlapping with the region of difference 308. The region of similarity 310 may indicate locations where the first image 302 and the second image 304 are the same. Thus, the difference image 306 may be a binary image representing the region of difference 308 using a first pixel color and the region of similarity 310 using a second pixel color. The region of difference 308 and the region of similarity 310 do not necessarily perfectly represent each and every difference and similarity between the first image

302 and the second image 304. For example, the region of difference 308 may represent less than all actual differences between the first image 302 and the second image 304 and/or may encompass similarities between the first image 302 and the second image 304.

To generate the difference image 306, the controller 130 may process the first image 302 and the second image 304 using an image processing technique capable of foreground and/or background detection. For example, the controller 130 may process the first image 302 and the second image 304 using a foreground detection image processing technique, a background subtraction image processing technique, and/or an optical flow image processing technique. As an example, the controller 130 may use a mixture of Gaussian background subtraction image processing technique to process the first image 302 and the second image 304.

In some examples, following the image processing technique, the controller 130 may process the difference image 306 using one or more morphological operations to reduce noise and/or to better define the region of difference 308 or the region of similarity 310. For example, the morphological operations may transform the region of difference 308 into a solid geometry (as well as transform the region of similarity 310 into a solid geometry). "Solid geometry" may refer to the region of difference 308 having no gaps or other discontinuities within an outer perimeter of the region of difference 308 (e.g., there are no islands of the region of similarity 310 within the region of difference 308). The morphological operations may include one or more foreground erosion operations (e.g., to shrink or thin the foreground) and/or one or more foreground dilation operations (e.g., to expand or grow the foreground). The controller 130 may perform the morphological operations in a sequence of one or more foreground erosion operations and one or more foreground dilation operations (e.g., the controller 130 may process the difference image 306 with a foreground erosion operation followed by a foreground dilation operation).

The region of difference 308 may represent an exclusion zone used for object detection. For example, if the implement 112 has moved in a depiction of the second image 304 relative to the first image 302, the region of difference 308 may represent an exclusion zone that encompasses the implement 112. Accordingly, in this case, the region of similarity 310 may represent an inclusion zone used for object detection.

Alternatively, the region of difference 308 may represent an inclusion zone used for object detection. For example, if the machine 100 has moved in the environment in a depiction of the second image 304 relative to the first image 302, the region of difference 308 may represent an inclusion zone that excludes the machine 100. Accordingly, in this case, the region of similarity 310 may represent an exclusion zone used for object detection.

In some implementations, the controller 130 may further process the difference image 306 to generate data relating to an exclusion zone or an inclusion zone (e.g., which the controller 130 may store for subsequent object detection). For example, the controller 130 may process the difference image 306 to identify a location (e.g., pixel coordinates), such as an edge or a center, of the region of difference 308 and/or the region of similarity 310.

The controller 130 may perform object detection using a machine learning model. For example, the controller 130 may implement a machine learning model that is trained (e.g., by another device off-board the machine 100) to detect and identify objects in the environment of the machine 100 using image data collected by the camera 132. Moreover, the controller 130 may perform object detection on image data from the camera 132 using the difference image 306. For example, the controller 130 may perform object detection based on an exclusion zone and/or an inclusion zone indicated by the region of difference 308 and/or the region of similarity 310. In particular, the controller 130 may refrain from performing object detection (e.g., not process, not label, or discard labeling) for objects within the exclusion zone, and the controller 130 may perform object detection for objects outside the exclusion zone (within the inclusion zone).

As one example, when performing object detection, the controller 130 may detect an object in an image frame of the image data, and the controller 130 may identify a location of the object (e.g., pixel coordinates representing an edge of the object or a center of the object) in the image frame. The controller 130 may then compare (e.g., by comparing pixel coordinates) the location of the object in the image frame to the region of difference 308 in the difference image 306 (e.g., which may include a direct comparison to the region of difference 308, or an indirect comparison achieved by comparison to the region of similarity 310). The controller 130 may selectively discard or output object detection data associated with the object (e.g., a label for the object) based on whether the location of the object is within the region of difference 308. For example, the controller 130 may discard the object detection data if the location of the object is within an exclusion zone indicated by the region of difference 308.

As another example, the controller 130 may use the difference image 306 as an image mask that defines an exclusion zone or an inclusion zone. For example, the image mask may be combined with image frames of the image data to mask over (e.g., with black or white pixels) the exclusion zone in the image frames. In some examples, the difference image 306, or an image mask derived therefrom, may be provided as an input to the machine learning model, and the machine learning model may perform object detection with respect to the difference image 306 or image mask (e.g., the machine learning model may ignore the exclusion zone when performing object detection).

As indicated above, FIG. 3 is provided as an example. Other examples may differ from what is described with regard to FIG. 3.

FIG. 4 is a flowchart of an example process 400 associated with exclusion zone or inclusion zone generation for object detection. One or more process blocks of FIG. 4 may be performed by the controller 130. Additionally, or alternatively, one or more process blocks of FIG. 4 may be performed by another device or a group of devices separate from or including the controller 130, such as another device or component that is internal or external to the machine 100.

As shown in FIG. 4, process 400 may include obtaining, from a camera, a first image and a second image depicting a work machine in an environment, where an implement of the work machine has moved, or the work machine has moved in the environment, in a depiction of the second image relative to the first image (block 410). For example, the controller 130 (e.g., using a memory, a processor, an input component, and/or a communication component) may obtain, from the camera, the first image and the second image depicting the work machine in the environment, as described above.

Obtaining the first image and the second image may include causing presentation, in a user interface, of a first prompt that requests movement of the implement into a first calibration position, receiving, via the user interface, a first indication that the implement is moved into the first calibration position, obtaining, from the camera, the first image responsive to the first indication, causing presentation, in the user interface, of a second prompt that requests movement of the implement into a second calibration position, receiving, via the user interface, a second indication that the implement is moved into the second calibration position, and obtaining, from the camera, the second image responsive to the second indication.

Alternatively, obtaining the first image and the second image may include causing the implement to move into a first calibration position, obtaining, from the camera, the first image responsive to movement of the implement into the first calibration position, causing the implement to move into a second calibration position, and obtaining, from the camera, the second image responsive to movement of the implement into the second calibration position.

Alternatively, obtaining the first image and the second image may include detecting that the implement is in a first calibration position, obtaining, from the camera, the first image, depicting the implement in the first calibration position, responsive to detection of the implement in the first calibration position, detecting that the implement is in a second calibration position, and obtaining, from the camera, the second image, depicting the implement in the second calibration position, responsive to detection of the implement in the second calibration position.

As further shown in FIG. 4, process 400 may include generating a difference image that depicts a region of difference between the first image and the second image (block 420). For example, the controller 130 (e.g., using a memory and/or a processor) may generate the difference image, as described above. Generating the difference image may include processing the first image and the second image using a foreground detection image processing technique, a background subtraction image processing technique, or an optical flow image processing technique. Process 400 may include processing the difference image using one or more morphological operations to transform the region of difference into a solid geometry.

As further shown in FIG. 4, process 400 may include performing object detection on image data from the camera based on the difference image, where the region of difference depicted in the difference image is an exclusion zone or an inclusion zone used for the object detection (block 430). For example, the controller 130 (e.g., using a memory, a processor, an input component, a communication component, or an output component) may perform object detection on image data from the camera based on the difference image, as described above.

Performing the object detection may include detecting an object in an image frame of the image data, identifying a location of the object in the image frame, comparing a location of the object to the region of difference in the difference image, and selectively discarding or outputting object detection data associated with the object based on whether the location of the object is within the region of difference.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

INDUSTRIAL APPLICABILITY

The object detection calibration system 200 described herein may be used with any machine that uses an object detection system. For example, the object detection calibration system 200 may be used with the object detection system of a work machine that performs work tasks at a worksite, such as a backhoe loader, a wheel loader, a harvester, an excavator, a motor grader, a skid steer loader, a dozer, or the like. The object detection system may use a machine learning model to perform object detection for various objects of interest commonly present at a worksite, such as humans. The object detection system may sometimes mistakenly identify an implement of the work machine (e.g., a ripper), that is in a field of view of a camera of the object detection system, as a human, thereby resulting in unnecessary avoidance actions being taken for the machine, excessive machine downtime, and/or work delays.

The object detection calibration system 200 is useful for calibrating an object detection system. In particular, the object detection calibration system may be used to generate an exclusion zone and/or an inclusion zone for the object detection system. The object detection calibration system may generate an exclusion zone using images and image processing techniques, thereby eliminating the need for a machine's operator to manually enter an exclusion zone. The exclusion zone may encompass an implement of the machine, thereby allowing the implement to be ignored when object detection is being performed. In this way, object detection can be performed accurately with less misidentification, thereby improving a performance of the object detection and reducing work delays, machine downtime, or the like.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z. " As used herein, "a," "an," and a "set" are intended to include one or more items, and may be used interchangeably with "one or more. " Further, as used herein, the article "the" is intended to include one or more items referenced in connection with the article "the" and may be used interchangeably with "the one or more. " Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An object detection calibration system, comprising:

a camera configured to mount on a work machine and to capture images relating to an environment of the work machine; and a controller configured to:

obtain, from the camera, based on movement of an implement of the work machine into a first calibration position, a first image depicting the work machine in the environment, and obtain, from the camera, based on movement of the implement of the work machine into a second calibration position, a second image depicting the work machine in the environment, wherein the implement of the work machine has moved in a depiction of the second image relative to the first image;

generate a difference image that depicts a region of difference between the first image and the second image; and perform object detection on image data from the camera based on the difference image, wherein the region of difference depicted in the difference image is an exclusion zone for the object detection.

2. The object detection calibration system of claim 1, wherein the controller is further configured to:

process the difference image using one or more morphological operations to transform the region of difference into a solid geometry.

3. The object detection calibration system of claim 2, wherein the one or more morphological operations include a sequence of one or more foreground erosion operations and one or more foreground dilation operations.

4. The object detection calibration system of claim 1, wherein the first image depicts the implement in the first calibration position, and the second image depicts the implement in the second calibration position different from the first calibration position.

5. The object detection calibration system of claim 1, wherein the first image depicts the implement in the first calibration position in which the implement occupies a greater area of the first image than any other position of the implement would occupy, and the second image depicts the implement in the second calibration position different from the first calibration position.

6. The object detection calibration system of claim 1, wherein the controller, to obtain the first image and the second image, is configured to:

cause presentation, in a user interface, of a first prompt that requests movement of the implement into the first calibration position;

receive, via the user interface, a first indication that the implement is moved into the first calibration position;

cause presentation, in the user interface, of a second prompt that requests movement of the implement into the second calibration position; and receive, via the user interface, a second indication that the implement is moved into the second calibration position.

7. The object detection calibration system of claim 1, wherein the controller, to obtain the first image and the second image, is configured to:

cause the implement to move into the first calibration position; and cause the implement to move into the second calibration position.

8. The object detection calibration system of claim 1, wherein the controller, to obtain the first image and the second image, is configured to:

detect that the implement is in the first calibration position; and detect that the implement is in the second calibration position.

9. The object detection calibration system of claim 1, wherein the controller, to generate the difference image, is configured to:

process the first image and the second image using a foreground detection image processing technique, a background subtraction image processing technique, or an optical flow image processing technique.

10. The object detection calibration system of claim 1, wherein the implement is a ripper, and wherein the first image depicts the ripper in a fully-raised position, and the second image depicts the ripper in a non-fully-raised position.

11. A method, comprising:

obtaining, from a camera, based on movement of an implement of a work machine into a first position or movement of the work machine to a first location, a first image depicting the work machine in an environment, and obtaining, from the camera, based on movement of the implement of the work machine into a second position or movement of the work machine to a second location, a second image depicting the work machine in the environment, wherein the implement of the work machine has moved, or the work machine has moved in the environment, in a depiction of the second image relative to the first image;

generating a difference image that depicts a region of difference between the first image and the second image; and performing object detection on image data from the camera based on the difference image, wherein the region of difference depicted in the difference image is an exclusion zone or an inclusion zone used for the object detection.

12. The method of claim 11, further comprising:

processing the difference image using one or more morphological operations to transform the region of difference into a solid geometry.

13. The method of claim 11, wherein performing the object detection comprises:

detecting an object in an image frame of the image data;

identifying a location of the object in the image frame;

comparing the location of the object to the region of difference in the difference image; and selectively discarding or outputting object detection data associated with the object based on whether the location of the object is within the region of difference.

14. The method of claim 11, wherein the difference image is a binary image.

15. The method of claim 11, wherein the first image depicts the implement in the first position in which the implement is in a farthest position of the implement from the camera, and the second image depicts the implement in the second position in which the implement is in a closest position of the implement to the camera.

16. A work machine, comprising:

a frame;

an implement connected to the frame;

a camera configured to capture images relating to an environment of the work machine; and a controller configured to:

obtain, from the camera, based on movement of the implement of the work machine into a first position or movement of the work machine to a first location, a first image depicting the work machine in the environment, and obtain, from the camera, based on movement of the implement of the work machine into a second position or movement of the work machine to a second location, a second image depicting the work machine in the environment, wherein the second image differs from the first image by a depiction of the work machine or the environment;

generate a difference image that depicts a region of difference between the first image and the second image; and perform object detection on image data from the camera based on the difference image, wherein the region of difference depicted in the difference image is an exclusion zone or an inclusion zone used for the object detection.

17. The work machine of claim 16, wherein the controller is further configured to:

process the difference image using one or more morphological operations to transform the region of difference into a solid geometry.

18. The work machine of claim 16, wherein the camera is positioned in a rear-facing configuration with respect to the work machine.

19. The work machine of claim 16, wherein the implement is a ripper, and wherein the first image depicts the ripper in a fully-raised position, and the second image depicts the ripper in a non-fully-raised position.

20. The work machine of claim 16, wherein the first image depicts the implement in the first position in which the implement occupies a greater area of the first image than any other position of the implement would occupy, and the second image depicts the implement in the second position different from the first position.

* * * * *